(12) United States Patent
Wilkins et al.

(10) Patent No.: US 7,862,700 B2
(45) Date of Patent: Jan. 4, 2011

(54) WATER TREATMENT SYSTEM AND METHOD

(75) Inventors: Frederick Wilkins, Pepperell, MA (US);
Evgeniya Freydina, Acton, MA (US);
Aytac Sezgi, Bedford, NH (US);
Reshma Madhusudan, Arlington Heights, IL (US); Anil D. Jha, Lincoln, MA (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 1648 days.

(21) Appl. No.: 10/712,162

(22) Filed: Nov. 13, 2003

(65) Prior Publication Data

US 2005/0103723 A1   May 19, 2005

(51) Int. Cl.
*B01D 61/48* (2006.01)
(52) U.S. Cl. ....................... 204/524; 204/632
(58) Field of Classification Search ............... 204/632, 204/524
See application file for complete search history.

(56) References Cited

U.S. PATENT DOCUMENTS

| | | | |
|---|---|---|---|
| 2,514,415 A | 7/1950 | Rasch | |
| 2,535,035 A | * 12/1950 | Briggs | ............... 205/746 |
| 2,681,319 A | 6/1954 | Bodamer | |
| 2,681,320 A | 6/1954 | Bodamer | |
| 2,788,319 A | 4/1957 | Pearson | |
| 2,794,777 A | 6/1957 | Pearson | |
| 2,815,320 A | 12/1957 | Kollsman | |
| 2,854,394 A | 9/1958 | Kollsman | |
| 2,923,674 A | 2/1960 | Kressman | |
| 2,943,989 A | 7/1960 | Kollsman | |
| 3,014,855 A | 12/1961 | Kressman | |
| 3,074,864 A | 1/1963 | Gaysowski | |
| 3,099,615 A | 7/1963 | Kollsman | |
| 3,148,687 A | 9/1964 | Dosch | |
| 3,149,061 A | 9/1964 | Parsi | |
| 3,149,062 A | 9/1964 | Gottschal et al. | |
| 3,165,460 A | 1/1965 | Zang et al. | |
| 3,291,713 A | 12/1966 | Parsik | |
| 3,330,750 A | 7/1967 | McRae et al. | |
| 3,341,441 A | 9/1967 | Giuffrida et al. | |
| 3,375,208 A | 3/1968 | Duddy | |
| 3,627,703 A | 12/1971 | Kojima et al. | |

(Continued)

FOREIGN PATENT DOCUMENTS

AU   B-18629/92   10/1992

(Continued)

OTHER PUBLICATIONS

Yoran Oren et al., "Studies on Polarity Reversal with Continuous Deionization," *Desalination*, Elsevier Scientific Publishing Co., Amsterdam, NL, vol. 86, No. 2, Jun. 1, 1992, pp. 155-171.

(Continued)

*Primary Examiner*—Arun S Phasge
(74) *Attorney, Agent, or Firm*—Lando & Anastasi, LLP

(57) ABSTRACT

A method and apparatus for producing purified water. Treated water may be provided for domestic use wherein the water may be treated by removing selected dissolved species while retaining properties that may improve the properties or aesthetics of the water.

10 Claims, 8 Drawing Sheets

U.S. PATENT DOCUMENTS

| | | |
|---|---|---|
| 3,630,378 A | 12/1971 | Bauman |
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno et al. |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,808,287 A | 2/1989 | Hark |
| 4,830,721 A * | 5/1989 | Bianchi et al. ............... 210/748 |
| 4,849,102 A | 7/1989 | Latour et al. |
| 4,871,431 A * | 10/1989 | Parsi ......................... 204/524 |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeaux et al. |
| 5,240,579 A | 8/1993 | Kedem |
| 5,254,227 A | 10/1993 | Cawlfield et al. |
| 5,259,936 A | 11/1993 | Ganzi |
| 5,286,354 A | 2/1994 | Bard et al. |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,376,253 A | 12/1994 | Rychen et al. |
| 5,411,641 A | 5/1995 | Trainham, III et al. |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Batchelder et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Batchelder et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |
| 5,925,240 A | 7/1999 | Wilkins et al. |
| 5,928,807 A | 7/1999 | Elias |
| 5,954,935 A | 9/1999 | Neumeister et al. |
| 5,961,805 A | 10/1999 | Terada et al. |
| 5,980,716 A | 11/1999 | Horinouchi et al. |
| 6,056,878 A | 5/2000 | Tessier et al. |
| 6,099,716 A | 8/2000 | Molter et al. |
| 6,103,125 A | 8/2000 | Kuepper |
| 6,126,805 A | 10/2000 | Batchelder et al. |

| | | | | | | |
|---|---|---|---|---|---|---|
| RE36,972 | E | 11/2000 | Baker et al. | EP | 1172145 A2 | 1/2002 |
| 6,146,524 | A | 11/2000 | Story | EP | 1222954 A1 | 7/2002 |
| 6,149,788 | A * | 11/2000 | Tessier et al. ............ 204/524 | EP | 1506941 A1 | 2/2005 |
| 6,171,374 | B1 | 1/2001 | Barton et al. | GB | 776469 | 6/1957 |
| 6,187,154 | B1 | 2/2001 | Yamaguchi et al. | GB | 877239 | 9/1961 |
| 6,187,162 | B1 | 2/2001 | Mir | GB | 880344 | 10/1961 |
| 6,190,528 | B1 | 2/2001 | Li et al. | GB | 893051 | 4/1962 |
| 6,190,553 | B1 | 2/2001 | Lee | GB | 942762 | 11/1963 |
| 6,190,558 | B1 | 2/2001 | Robbins | GB | 1048026 | 11/1966 |
| 6,193,869 | B1 | 2/2001 | Towe et al. | GB | 1137679 | 12/1968 |
| 6,197,174 | B1 | 3/2001 | Barber et al. | GB | 1 381 681 A | 1/1975 |
| 6,197,189 | B1 | 3/2001 | Schwartz et al. | GB | 1448533 | 9/1976 |
| 6,214,204 | B1 | 4/2001 | Gadkaree et al. | JP | 54-5888 | 1/1979 |
| 6,228,240 | B1 | 5/2001 | Terada et al. | JP | 07-155750 | 6/1995 |
| 6,235,166 | B1 | 5/2001 | Towe et al. | JP | 07-265865 | 10/1995 |
| 6,248,226 | B1 | 6/2001 | Shinmei et al. | JP | 09-253643 | 9/1997 |
| 6,254,741 | B1 | 7/2001 | Stuart et al. | JP | 11-42483 | 2/1999 |
| 6,258,278 | B1 | 7/2001 | Tonelli et al. | JP | 2001-79358 | 3/2001 |
| 6,267,891 | B1 | 7/2001 | Tonelli et al. | JP | 2001-79553 | 3/2001 |
| 6,274,019 | B1 | 8/2001 | Kuwata | JP | 2001-104960 | 4/2001 |
| 6,284,124 | B1 | 9/2001 | DiMascio et al. | JP | 2001-113137 | 4/2001 |
| 6,284,399 | B1 | 9/2001 | Oko et al. | JP | 2001-113279 | 4/2001 |
| 6,296,751 | B1 | 10/2001 | Mir | JP | 2001-113280 | 4/2001 |
| 6,303,037 | B1 | 10/2001 | Tamura et al. | JP | 2001-121152 | 5/2001 |
| 6,344,122 | B1 * | 2/2002 | Deguchi et al. ............ 204/632 | JP | 2003094064 | 4/2003 |
| 6,375,812 | B1 | 4/2002 | Leonida | JP | 2005007347 | 1/2005 |
| 6,402,916 | B1 | 6/2002 | Sampson et al. | JP | 2005007348 | 1/2005 |
| 6,402,917 | B1 | 6/2002 | Emery et al. | RO | 114 874 B | 8/1999 |
| 6,482,304 | B1 | 11/2002 | Emery et al. | SU | 216622 | 11/1972 |
| 6,607,647 | B2 | 8/2003 | Wilkins et al. | SU | 990256 | 1/1983 |
| 6,607,668 | B2 | 8/2003 | Rela | SU | 1118389 | 10/1984 |
| 6,627,073 | B2 | 9/2003 | Hirota et al. | WO | WO 92/11089 | 7/1992 |
| 6,648,307 | B2 | 11/2003 | Nelson et al. | WO | WO 95/32052 | 11/1995 |
| 6,649,037 | B2 | 11/2003 | Liang et al. | WO | WO 95/32791 | 12/1995 |
| 6,766,812 | B1 | 7/2004 | Gadini | WO | WO 96/22162 | 7/1996 |
| 6,783,666 | B2 | 8/2004 | Takeda et al. | WO | WO 97/25147 | 7/1997 |
| 6,808,608 | B2 | 10/2004 | Srinivasan et al. | WO | WO 97/46491 | 12/1997 |
| 6,824,662 | B2 | 11/2004 | Liang et al. | WO | WO 97/46492 | 12/1997 |
| 2001/0003329 | A1 | 6/2001 | Sugaya et al. | WO | WO 98/11987 | 3/1998 |
| 2002/0092769 | A1 | 7/2002 | Garcia et al. | WO | WO 98/17590 | 4/1998 |
| 2002/0189951 | A1 | 12/2002 | Liang et al. | WO | WO 98/20972 | 5/1998 |
| 2003/0080467 | A1 | 5/2003 | Andrews et al. | WO | WO 98/58727 | 12/1998 |
| 2003/0089609 | A1 | 5/2003 | Liang et al. | WO | WO 98/58727 A1 | 12/1998 |
| 2003/0098266 | A1 | 5/2003 | Shiue et al. | WO | WO 99/39810 | 8/1999 |
| 2003/0155243 | A1 | 8/2003 | Sferrazza | WO | WO 00/30749 | 6/2000 |
| 2003/0201235 | A1 | 10/2003 | Chidambaran et al. | WO | WO 00/64325 A2 | 11/2000 |
| 2004/0079700 | A1 | 4/2004 | Wood et al. | WO | WO 00/75082 A1 | 12/2000 |
| 2004/0089551 | A1 | 5/2004 | Liang et al. | WO | WO 01/49397 A1 | 7/2001 |
| 2005/0109703 | A1 | 5/2005 | Newenhizen | WO | WO 02/04357 A1 | 1/2002 |
| 2006/0060532 | A1 | 3/2006 | Davis | WO | WO 02/14224 A1 | 2/2002 |
| 2006/0231403 | A1 | 10/2006 | Riviello | WO | WO 03/086590 A1 | 10/2003 |

FOREIGN PATENT DOCUMENTS

| | | |
|---|---|---|
| CA | 2316012 A1 | 11/2001 |
| CN | 1044411 A | 8/1990 |
| DE | 1 201 055 | 9/1965 |
| DE | 3238280 A1 | 4/1984 |
| DE | 4016000 A1 | 11/1991 |
| DE | 44 18 812 A1 | 12/1995 |
| DE | 199 42 347 A1 | 3/2001 |
| EP | 0170895 A2 | 2/1986 |
| EP | 0 503 589 A1 | 9/1992 |
| EP | 0 621 072 A2 | 10/1994 |
| EP | 0 621 072 B1 | 10/1994 |
| EP | 0 680 932 A2 | 11/1995 |
| EP | 0803474 A2 | 10/1997 |
| EP | 0 870 533 A1 | 10/1998 |
| EP | 1 068 901 A2 | 1/2001 |
| EP | 1068901 A2 | 1/2001 |
| EP | 1075 868 A2 | 2/2001 |
| EP | 1 101 790 A1 | 5/2001 |
| EP | 1 106 241 A1 | 6/2001 |

OTHER PUBLICATIONS

Wood, J.H. et al., "Continuous Electrodeionisation: Module Design Considerations for the Production of High Purity Water," *Proc. Of IEX at the Millenium*, Jul. 6, 2000, pp. 44-51.

Astm, "Standard Practice for Calculation and Adjustment of the Langelier Saturation Index for Reverse Osmosis," Designation: D3739-94 (Reapproved 1998), pp. 1-4.

Ganzi, G.C. et al., "Electrodeionization: Theory and Practice of Continuous Electrodeionization," *Ultrapure Water*, Jul./Aug. 1997, pp. 64-69.

G.J. Gittens et al., "The Application of Electrodialysis to Demineralisation," A.I.Ch.E.-I.Chem.E. Symposium Series No. 9, 1965 (London: Instn. chem. Engrs), pp. 79-83.

Glueckauf, "Electro-Deionisation Through a Packed Bed," *British Chemical Engineering*, Dec. 1959, pp. 646-651.

Hobro et al., "Recycling of Chromium from Metal Finishing Waste Waters Using Electrochemical Ion Exchange (EIX)," 1994, pp. 173-183, publication and date unknown.

Jha, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510-517.

Kedem et al., "EDS—Sealed Cell Electrodialysis," *Desalination*, vol. 46, 1983, pp. 291-299.

Kedem et al., "Reduction of Polarization by Ion-Conduction Spacers: Theoretical Evaluation of a Model System," *Desalination*, vol. 27, 1978, pp. 143-156.

Korngold, "Electrodialysis Process Using Ion Exchange Resins Between Membranes," *Desalination*, vol. 16, 1975, pp. 225-233.

Laktionov, Evgueni Viktorovitch, "Déminéralisation De Solutions Électrolytiques Diluées. Analyse Comparative Des Performances De Differents Procédés D'Électrodialyse", Directeur de these, Université Montpellier II, Science Et Technique Du Languedoc, 17 Juillet 1998.

Matejka, "Continuous Production of High-Purity Water by Electro-Deionisation," *J. Appl. Chem., Biotechnol.*, vol. 21, Apr. 1971, pp. 117-120.

Pourcelly, Gerald, Conductivity and selectivity of ion exchange membranes: structure-correlations, *Desalination*, vol. 147 (2002) pp. 359-361.

Purolite Technical Bulletin, Hypersol-Macronet™ Sorbent Resins, 1995.

V. Shaposhnik et al., "Demineralization of water by electrodialysis with ion-exchange membranes, grains and nets," *Desalination*, vol. 133, (2001), pp. 211-214.

R. Simons, "Strong Electric Field Effects on Proton Transfer Between Membrane-Bound Amines and Water," *Nature*, vol. 280, Aug. 30, 1979, pp. 824-826.

R. Simons, "Electric Field Effects on Proton Transfer Between Ionizable Groups and Water in Ion Exchange Membranes," *Electrochimica Acta*, vol. 29, No. 2, 1984, pp. 151-158.

R. Simons, "Water Splitting In Ion Exchange Membranes," Pergamon Press Ltd., 1985, pp. 275-282.

R. Simons, "The Origin and Elimination of Water Splitting in Ion Exchange Membranes During Water Demineralisation By Electrodialysis," *Desalination*, vol. 28, Jan. 29, 1979, pp. 41-42.

USFilter, "H-Series Industrial CDI® Systems," product information, 1998, 4 pgs.

Walters et al., "Concentration of Radioactive Aqueous Wastes," *Industrial and Engineering Chemistry*, Jan. 1955, pp. 61-67.

Warshawsky et al., "Thermally Regenerable Polymerable Polymeric Crown Ethers, II Synthesis and Application in Electrodialysis," pp. 579-584, publication and date unknown.

* cited by examiner

WATER TREATMENT SYSTEM AND METHOD

BACKGROUND OF THE INVENTION

1. Field of the Invention

The invention is directed to a method and apparatus for treating water and, more specifically, for providing a high quality water for consumption and use.

2. Description of Related Art

Water that contains hardness species such as calcium and magnesium may be undesirable for some uses in industrial, commercial and household applications. The typical guidelines for a classification of water hardness are: zero to 60 milligrams per liter (mg/l) as calcium carbonate is classified as soft; 61 to 120 mg/l as moderately hard; 121 to 180 mg/l as hard; and more than 180 mg/l as very hard.

Hard water can be softened or purified by removing the hardness ion species. Examples of systems that remove such species include those that use ion exchange beds. In such systems, the hardness ions become ionically bound to oppositely charged ionic species that are mixed on the surface of the ion exchange resin. The ion exchange resin eventually becomes saturated with ionically bound hardness ion species and must be regenerated. Regeneration typically involves replacing the bound hardness species with more soluble ionic species, such as sodium chloride. The hardness species bound on the ion exchange resin are replaced by the sodium ions and the ion exchange resins are ready again for a subsequent water softening step.

Such systems have been disclosed. For example, Dosch, in U.S. Pat. No. 3,148,687 teaches a washing machine including a water softening arrangement using ion exchange resins. Similarly, Gadini et al., in International Application Publication No. WO00/64325, disclose a household appliance using water with an improved device for reducing the water hardness. Gadini et al. teach of a household appliance having a control system, a water supply system from an external source and a softening system with an electrochemical cell.

Electrodeionization (EDI) is one process that may be used to soften water. EDI is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices can include media having permanent or temporary charge and can be operated to cause electrochemical reactions designed to achieve or enhance performance. These devices also include electrically active membranes such as semi-permeable ion exchange or bipolar membranes.

Continuous electrodeionization (CEDI) is a process wherein the primary sizing parameter is the transport through the media, not the ionic capacity of the media. A typical CEDI device includes alternating electroactive semi-permeable anion and cation exchange membranes. The spaces between the membranes are configured to create liquid flow compartments with inlets and outlets. A transverse DC electrical field is imposed by an external power source using electrodes at the bounds of the membranes and compartments. Often, electrolyte compartments are provided so that reaction product from the electrodes can be separated from the other flow compartments. Upon imposition of the electric field, ions in the liquid are attracted to their respective counter-electrodes. The adjoining compartments, bounded by the electroactive anion permeable membrane facing the anode and the electroactive cation membrane facing the cathode, typically become ionically depleted and the compartments, bounded by the electroactive cation permeable membrane facing the anode and the electroactive anion membrane facing the cathode, typically become ionically concentrated. The volume within the ion-depleting compartments and, in some embodiments, within the ion-concentrating compartments, also includes electrically active media. In CEDI devices, the media may include intimately mixed anion and cation exchange resins. The ion-exchange media typically enhances the transport of ions within the compartments and may participate as a substrate for controlled electrochemical reactions. Electrodeionization devices have been described by, for example, Giuffrida et al. in U.S. Pat. Nos. 4,632,745, 4,925,541 and 5,211,823, by Ganzi in U.S. Pat. Nos. 5,259,936 and 5,316,637, by Oren et al. in U.S. Pat. No. 5,154,809 and by Kedem in U.S. Pat. No. 5,240,579, which are incorporated herein by reference.

SUMMARY OF THE INVENTION

In one aspect, the invention provides a method of providing water comprising passing a first water stream through a depleting compartment of an electrodeionization device to produce a second water stream having an LSI less than about 0, passing the second water stream through a cathode compartment of the electrodeionization device to produce a third water stream, the third water stream being less corrosive than the first water stream and having an LSI of less than about 0.

In another aspect, the invention provides a method of providing potable water comprising passing a first water stream through a cathode compartment of an electrochemical device to produce a second water stream passing the second water stream through a depleting compartment of an electrochemical device to produce a third water stream having an LSI less than about 0, the third water stream being less corrosive than the first water stream.

In another aspect, the invention provides a method of retaining a residual chlorine level in water comprising removing greater than 90% of active chlorine from a first water stream; passing the water stream through a depleting compartment of an electrochemical device; removing a portion of any ions dissolved in the water stream, introducing the water stream to a loop, the loop including a storage vessel; and introducing active chlorine in a second water stream into the loop at a rate adequate to maintain an effective average chlorine concentration in the loop.

In another aspect, the invention provides a method of selectively retaining ions in a water supply comprising passing a feed water through a depleting compartment of an electrochemical device, the feed water comprising monovalent and divalent ions; removing at least 30% of the divalent cations from the feed water and retaining at least about 80% of a species selected from silica, boron and fluoride, to produce a treated water; and supplying the treated water for household consumption.

In another aspect, the invention provides a method of producing a purified water comprising passing a water stream through a depleting compartment of an electrochemical device and adjusting a voltage applied to the electrochemical device to control the current passing through the electrochemical device at a level adequate to remove greater than about 25% of any calcium in the water stream and inadequate to remove greater than about 10% of any fluoride or silica species from the water stream.

In another aspect, the invention provides a method comprising softening a feed water through a bed of ion exchange material to remove greater than 30% of any hardness ions from the feed water to produce a softened water, supplying the softened water for household consumption, and discharging a concentrated solution comprising calcium, wherein the sum of the ionic content of the softened water and the ionic content of the concentrated solution is no greater than the total ionic content supplied by the feed water.

BRIEF DESCRIPTION OF THE DRAWINGS

Preferred, non-limiting embodiments of the present invention will be described by way of example and with reference to the accompanying drawings, in which.

DETAILED DESCRIPTION OF THE INVENTION

Figure 1:
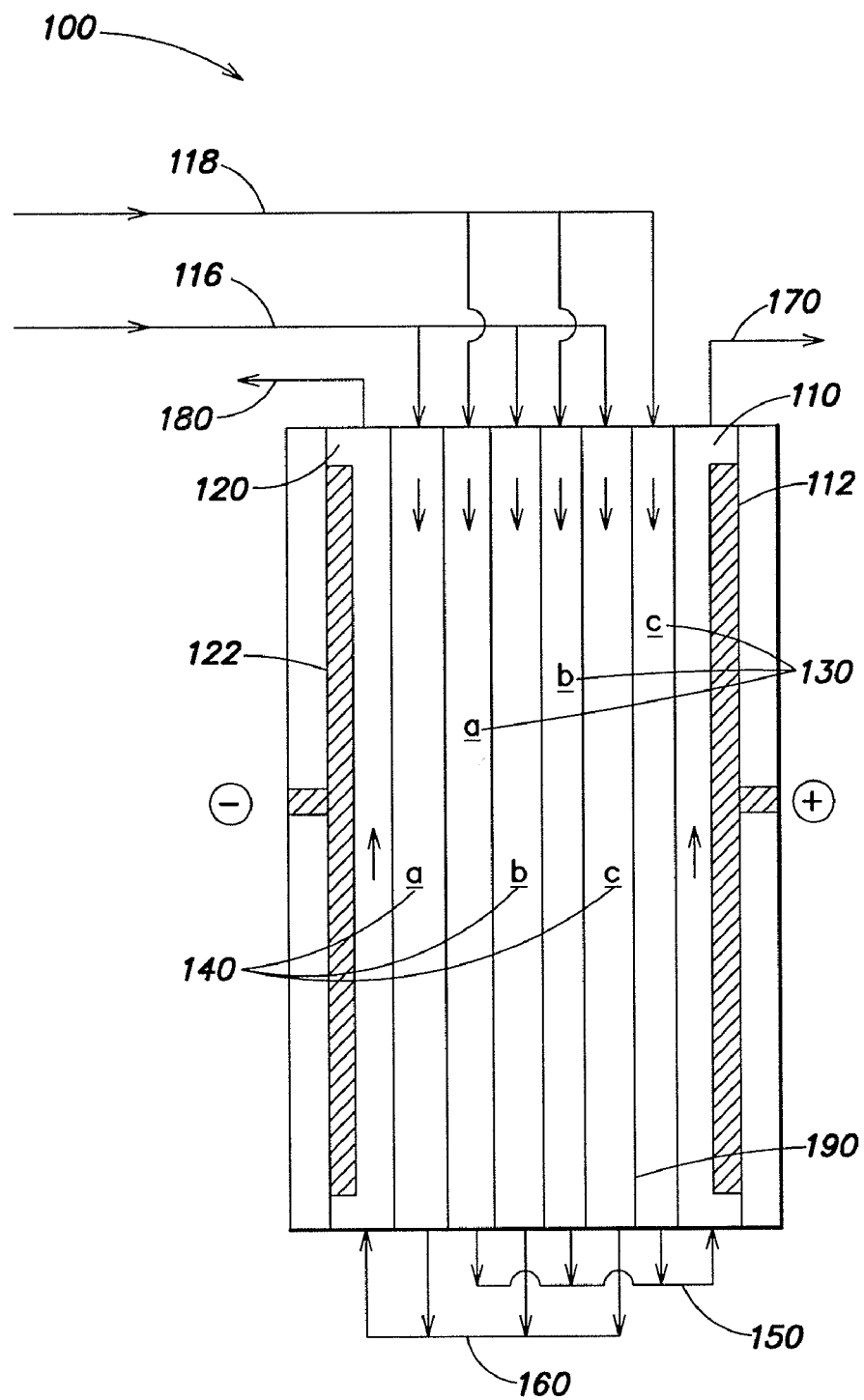
FIG. 1 is a schematic illustration of an electrochemical device or module in accordance with one or more embodiments of the invention.
Figure 2:
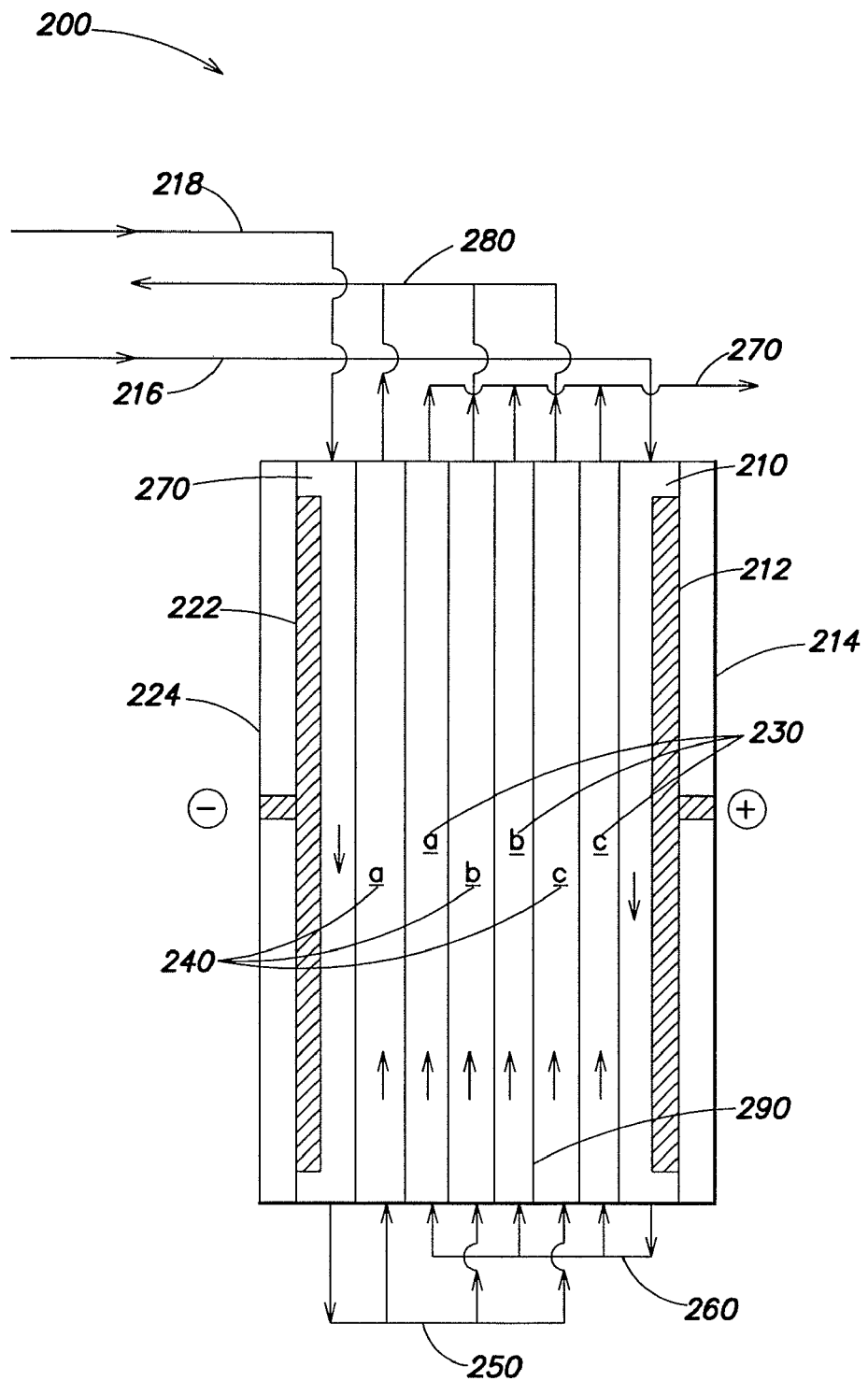
FIG. 2 is a schematic diagram of another electrochemical module in accordance with one or more embodiments of the invention.

United States Patent Applications titled WATER TREATMENT SYSTEM AND METHOD by Wilkins et al., which was filed on Nov. 13, 2003 and assigned application Ser. No. 10/712,674; titled WATER TREATMENT SYSTEM AND METHOD by Jha et al., which was filed on Nov. 13, 2003 and assigned application Ser. No. 10/712,621; titled WATER TREATMENT SYSTEM AND METHOD by Ganzi et al., which was filed on Nov. 13, 2003 and assigned application Ser. No. 10/712,250; titled WATER TREATMENT SYSTEM AND METHOD by Freydina et al., which was filed on Nov. 13, 2003, assigned application Ser. No. 10/712,248, and issued as U.S. Pat. No. 7,083,733 on Aug. 1, 2006; titled WATER TREATMENT SYSTEM AND METHOD by Wilkins et al., which was filed on Nov. 13, 2003 and assigned application Ser. No. 10/712,163; titled WATER TREATMENT SYSTEM AND METHOD by Freydina et al., which was filed on Nov. 13, 2003 and assigned application Ser. No. 10/712,685; and titled WATER TREATMENT SYSTEM AND METHOD by Jha et al., which was filed on Nov. 13, 2003 and assigned application Ser. No. 10/712,166 are hereby incorporated by reference herein.

The present invention provides a method and apparatus for providing purified or treated water from a variety of source types. Possible water sources include well water, surface water, municipal water and rain water. The treated product may be for general use or for human consumption or other domestic uses, for example, bathing, laundering, and dishwashing.

Often, quality drinking water is associated with highly purified water. However, as long as the water is free of microbial contamination, the best drinking water may not necessarily be the most chemically pure. For example, water that has been purified to a high resistivity, for example, greater than about 1 megaOhm, may be so devoid of ionic content that it becomes "hungry" and corrosive to material such as copper, that may be used in water piping systems. Taste may also be affected by, for instance, the removal of bicarbonate species. Furthermore, beneficial or desirable chemicals that have been added to the water, for example, fluoride and chlorine species, may be removed along with undesirable species, resulting in a water that may need to be re-fortified.

If a household is supplied with hard water, i.e., water containing greater than about 60 ppm calcium carbonate, it is often treated prior to use by being passed through a water softener. Typically, the water softener is of the rechargeable ion exchange type and is charged with cation resin in the sodium form and anion resin in the chloride form. As water passes through the resin bed, major contributors to hardness, such as calcium and magnesium species, are exchanged for sodium. In this manner, the water can be softened as the concentration of divalent cations and, in particular, calcium and magnesium ions, decreases. However, an equivalent of sodium is added to the treated water for every equivalent of calcium that is removed. Thus, although the water is softened, the hardness is replaced with sodium ions that some consumers may find undesirable. Furthermore, when these ion exchange beds are recharged by rinsing with sodium chloride solution, the resulting brine must be disposed of and is often discharged to a septic system where the brine becomes available to re-enter the ground water. In some jurisdictions, discharge of brine to a domestic septic system is regulated or prohibited.

Other methods of softening water include the use of reverse osmosis devices that can supply high purity water, but generally do so at a slow rate and require the use of a high pressure pump. Furthermore, many reverse osmosis membranes can be fouled by the presence of dissolved materials such as silica, which may often be found in well water.

Although the examples described herein use electrodeionization devices, other water treatment techniques, such as capacitive deionization, may be just as applicable.

Continuous electrodeionization can also be used to remove hardness components from a water supply. However, most CEDI systems have power, space and service requirements that make them impractical for domestic use. In addition, because chlorine may be undesirable in the presence of ion exchange resins, if a chlorinated water supply is to be softened, the chlorine often should first be removed from the water. This means that any water treated in this manner does not benefit from the residual bactericidal properties of the chlorinated water supply.

Frequently, CEDI systems are designed to remove as many ions as possible, and easily ionizable species such as calcium and sodium are efficiently removed so that less than 1% of the cations present in the feed water remains in the treated water. For many industrial and commercial uses, this highly purified water may be beneficial, however, this level of purity may be undesirable for a household water supply in which some level of cation content may be beneficial. Furthermore, this highly purified water may be corrosive and may be prone to attack copper pipes that are often present in domestic water distribution systems. Some domestic water distribution systems may include lead soldered joints, and heavy metals, such as lead, may also leach into water passing through the pipes.

In some jurisdictions, minimum levels of calcium may be necessary in order to comply with health and safety regulations. Thus, a high purity system that removes greater than, for example, 90 or 99% of the calcium from the water supply may be inappropriate in these locations.

The present invention in accordance with one or more embodiments, can utilize CEDI technology to produce purified or treated water with properties that may be ideal water for domestic consumption. For example, the apparatus can soften a hard or very hard water supply, yet retain some level of calcium, at a level below about 60 ppm calcium carbonate. In addition, chlorine can be retained in the water so that if the water, after treatment, is stored for any length of time, it retains at least some of its bactericidal qualities. Bicarbonate species may also be retained at levels that provide better tasting water. Fluoride may also be retained so that additional fluoride supplements may be unnecessary. In addition, compounds such as silica, boron and other less ionizable species may also be retained at desirable levels greater than other CEDI methods. By retaining some of these trace materials, such as boron and silica, the properties of the treated water may be improved over water which has had a greater amount of these materials removed. In some embodiments of the present invention, at least 80 or 90% of these compounds can be retained while more than 25%, 30% or 50% of hardness contributing compounds, such as calcium, are removed.

In addition, the invention provides for the addition of hydrogen ($H_2$) to the water, which may contribute to reducing the corrosivity of the treated water. The addition of hydrogen to the water may manifest itself by a detectable increase in dissolved hydrogen or a resulting decrease in the concentration of oxidative species. This may provide for desirable anti-oxidant properties as well. The pH, if altered at all, is generally close to that of the supply water and thus will not have deleterious effects on equipment or systems that are designed to use un-softened tap water at approximately neutral pH.

The apparatus of the invention, while having a relatively small foot print and using less energy than many CEDI, or other, treatment systems, still can supply quantities of treated or softened water that satisfy peak domestic demand situations. It may be able to supply softened water continuously, as no recharging cycle is required and a reserve of treated water may be formed.

Furthermore, the method and apparatus of the present invention may provide treated water without increasing the ionic load discharged from the treatment system. Conventional chemical treatment systems may require recharging with, for example, sodium chloride, that in turn is substituted for hardness species that are removed from the water. This means that both the hardness species and the substituted species are present in either the softened water or in discharged brine. This may add to the ionic load of waste water discharged from the home and may result in, for example, harm to ground water. Some embodiments of the present invention, however, may discharge only that ionic material that enters the home via the feed water. Furthermore, the total amount of waste water discharged as a result of the softening process may be significantly less than that with conventionally softened waters, for example, less than 10% or 5% of the volume of water treated.

Figure 3:
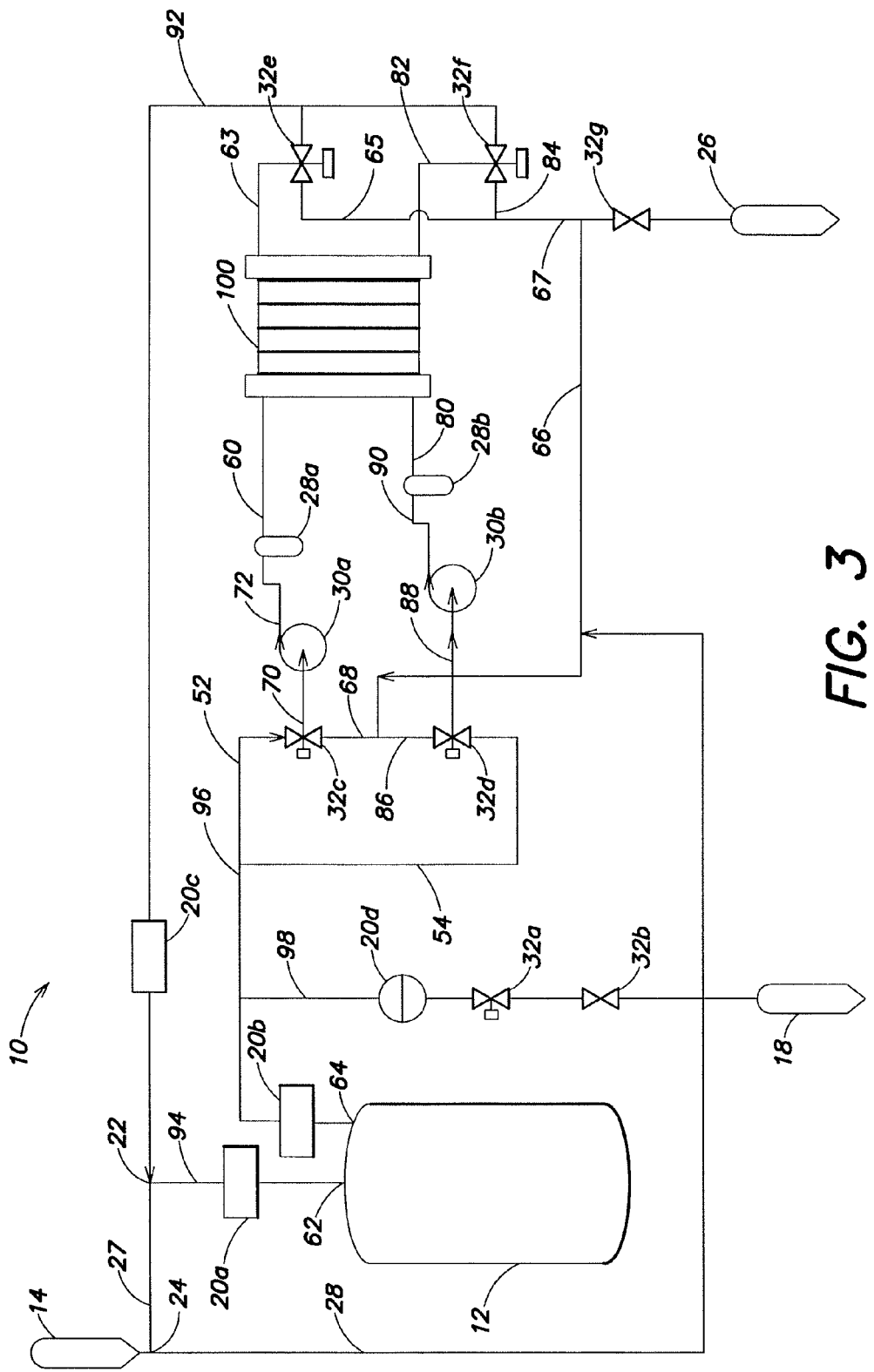
FIG. 3 is a schematic illustration of a system in accordance with one or more embodiments of the invention.

One embodiment of a system of the invention is illustrated schematically in FIG. 3 which shows a water softening system 10 that may be used in a variety of installations, such as in a home. Feed water is supplied at point of entry 14, that may be, for example, well water or a municipal water supply.

At tee 24 water can enter either or both of conduits 26 and 28. Water passing through conduit 26 is typically directed to conduit 94 at tee 22 and feeds storage vessel 12 after passing by pressure indicator 20a and through inlet 62. When demand for water exists downstream of the storage device, water exits through outlet 64, passes by pressure sensor 20B and enters either conduit 96, conduit 98 or both depending on the demand source. Conduit 98 leads past pressure sensor 20d and valves 32a and 32b to service point 18. Service point 18 may be fluidly connected to a plumbing system or may be selectively joined to a specific point of use, such as appliance or bath.

Water that passes through conduit 96 may enter either conduit 52 or conduit 54, or both. In one configuration, water entering conduit 52 is directed by valve 32c to conduit 70 and pump 30a. After passing through conduit 72 and optional pretreatment device 28a which may be, for example, a carbon filter, particulate filter, or aeration device, the water is directed to conduit 60 at which point it enters electrodeionization module 100. Water entering via conduit 60 is purified by passing through one or more ion-depleting (depleting) compartments and may also pass through an electrode compartment, for example, the cathode compartment.

By plumbing the depleting compartments (where treated, product water is produced) either upstream or downstream of the cathode compartment, the system can be grounded via the cathode. This may be particularly advantageous in a household setting, as it may reduce safety hazards for the consumer. Furthermore, hydrogen gas that may be formed at the cathode can be dissolved into the product water passing through, resulting in a product water that may be less corrosive than had the water bypassed the cathode compartment. Product water may feed (or receive water from) the cathode, the anode, or both. If the product water communicates with both electrodes, the system may be plumbed so that the depleting compartments are in series or parallel with the electrode compartments. After exiting electrodeionization module 100 via conduit 62 the purified water may be directed by valve 32e to conduit 92 and pressure reading device 20c. The water then proceeds to tee 22 and is directed to conduit 94 prior to entering storage vessel 12. Thus, storage vessel 12 may include purified water from conduit 92 as well as untreated, or minimally treated, water that is provided from point of entry 14. Storage vessel 12 may be configured so that these two water sources are mixed, or alternatively, that the two water sources are segregated, for example, one of the water sources may enter the bottom of storage vessel 12 and proceed in plug-flow manner upwardly to outlet 64. Performance of electrodeionization module 100 may be improved by pre-treatment that includes the removal of chlorine, a municipally treated water supply may be passed through a chlorine reducing filter such as carbon filter 28a or another pre-treatment device prior to entry into electrodeionization module 100.

Pre-treatment devices may also be placed elsewhere in the loop. Water that enters storage vessel 12 after being treated in electrodeionization module 100 may contain little or no chlorine (or alternative disinfectant) and to retain a residual chlorine level in storage tank 12 the water can be mixed with untreated water from point of entry 14. Preferably, the chlorinated water is added at a rate adequate to result in a mixed water that contains enough chlorine to inhibit bacteriologic activity. Active chlorine refers to those chlorine containing species that exhibit anti-microbial activity. An effective chlorine concentration is defined herein as a concentration of active chlorine compounds, for example, sodium hypochlorite, that inhibits the growth of bacteria, such as *e-Coli*, in storage vessel 12. Therefore, the ratio at which the feed water and treated water are mixed in storage vessel 12 may be dependent upon a number of factors including the efficiency of electrodeionization device 100, a desired effective chlorine concentration, the rate at which water contained in storage vessel 12 will be depleted, the temperature of storage vessel 12 and the source and quality of the feed water. Of course, if well water or another source of untreated water is used, maintenance of an effective disinfectant level may be disregarded.

While water is being recycled through the purification loop, additional water may be supplied via conduit 54 to valve 32d where it is directed to conduit 88, pump 30b, conduit 90, pretreatment unit 28b and conduit 80 prior to entering electrodeionization module 100. From conduit 80, water may feed one or more ion-concentrating (concentrating) compartments which may also be plumbed in series with the anode compartment. The anode compartment may lie either upstream or downstream of the concentrating compartment. By passing through the anode compartment, the pH of the water can be lowered and may result in water having a lower LSI. The lower LSI, which may be reduced to less than 0 (non-scaling), decreases the scaling potential of the water and thus provides for a lower maintenance, higher water recovery, increased longevity and more reliable system. Concentrate exiting electrodeionization module 100 typically enters conduit 82 and can be directed by valve 32f to conduits 84 and 64 where a portion of the concentrate may be discharged to waste either constantly or intermittently via valve 32g and drain 26. An additional portion of the water may enter conduit 66 and can be recycled to the electrodeionization module 100 via conduit 86 and valve 32d. In this manner, a concentrate solution may accept ions until a specific level is reached, for example, a pre-chosen LSI, so that a minimal amount of water can be discharged while maintaining a non-scaling environment throughout the loop. Water conservation can be improved further by using the concentrate for applications such as irrigation, that do not require softened water.

If a polarity reversal system or technique is used, the previously described loops can be switched so that the purification loop operates as the concentrating loop and the concentrating loop operates as the purification loop. In accordance with one or more embodiments of the invention, when the polarity of the anode and cathode are switched, the function of the concentrating and depleting compartments are also switched and pump 30a, pre-treatment device 28a, conduit 60 and conduit 62, as well as valve 32e each become part of the concentrating loop. Likewise, pump 30b, pre-treatment device 28b, conduits 80 and 82 and valve 32f become part of the purified loop supplying water to storage vessel 12. Thus, not only are the electrodeionization module compartments switched but all of the associated parts such as pre-treatment devices, pumps, valves, gauges and tees possibly excepting valve 32g are alternated between carrying purified water and concentrate water, resulting in decreased opportunity for prolonged scaling and increased opportunity for the dissolution of any scale that may have formed. This has proved particularly advantageous in reducing scaling in components such as valves, orifices, filters or tees. Reverse polarity cycles may be based on a number of factors, including time, source water quality, temperature, purified water quality, desired water quality and water use rates.

In addition to providing for effective levels of chlorine in storage tank 12, the system can be operated to maintain levels of other components such as bicarbonate, fluoride, silica and boron. The electrodeionization module 100 may contain ion exchange material and may be operated at a current and flow rate designed to minimize the removal of some or all of those species. In addition, some of the calcium, magnesium, iron, manganese or other hardness components present in the water may be retained to provide a purified water containing, for example, about 200, 300, 400 or 500 ppm hardness. This may result in a water that is less corrosive, and exhibits better aesthetic qualities than does water which has been reduced to a lower level of hardness. By removing, for example, about 20, 30, 40, 50 or 60% of the divalent cations in a single pass through the electrodeionization device, the device may require less power and a smaller foot print than would a device designed to more completely remove divalent cations from the water in a single pass.

In accordance with further embodiments, the systems and techniques of the present invention can comprise a post treatment system of subsystem capable of destroying or rendering inactive any bacteria that may be delivered to a point of use. For example, the post treatment system can comprise an apparatus or device that can irradiate treated or purified water with actinic radiation or expose with ozone or remove any bacteria by ultrafiltration and/or microfiltration.

In accordance with still further embodiments, the systems and techniques of the present invention can comprise providing systems and methods for disinfecting any wetted component of the treatment system by, for example, delivering or exposing at least a portion of the wetted component to a disinfectant such as halogen, a halogen donor, and/or a oxidizing compound such peroxygen compounds.

Example

As water treated with a CEDI system may contain reduced levels of TDS, pH and LSI when compared to untreated water, CEDI treated water was tested to determine how corrosive the product water might be. These results may be of particular importance when the CEDI treated water is to be used in a system including copper plumbing, such as many residential water systems. Specifically, water treated according to one embodiment of the invention was tested for copper corrosivity side-by-side with untreated water, CEDI treated water, and water treated by a conventional softening system. The corrosion, or leach, test was performed on 1" diameter×2" long copper pipes as coupons. The samples included CEDI treated water (2 configurations) as the challenge water with untreated water and softened water as two controls.

The untreated water (HARD) was well-water from Northbrook, Ill. having a TDS level of about 490 ppm, a hardness of about 18 gpg and a pH of about 7.8. The LSI of the untreated water ranged from about 0.8 to about 1. Conventionally softened water (SOFT) was obtained by treating the well-water with a 9" softener containing about 1 cu.ft. of standard CULLEX® resin available from Culligan Corporation, Northbrook, Ill. CEDI water was produced in trial 1 with a system that did not include an inline reservoir. In trial 2, CEDI treated water (PRODUCT) was obtained at the tank outlet of the inline reservoir of the CEDI system illustrated in FIG. 3. Thus, trial 2 included passing CEDI product water through the depleting compartments and then through the cathode compartment of the CEDI module.

The test coupons were prepared by cutting a 1" diameter copper pipe into about 2" long pieces and trimming them to remove all burrs. The coupons were rinsed in acetone followed by RO water to remove any grease and metal shavings from the cutting operation. The coupons were each cleaned in about 150 mls of 2N HCl solution for about 1 minute and sequestered in a neutralizing solution. They were then stored in a dessicator overnight after being rinsed again in RO water and wiped clean. A total of 12 coupons were prepared for trial 2.

Each category of water was set aside into five 500-ml beakers. Each of the samples of water were sampled periodically and in similar patterns. The samples were tested as follows:

Trial 1—

The first trial included fewer samples than Trial 2 and corrosion analysis was performed under stagnant conditions. The product water samples were taken from the system and analyzed at day 1, day 4 and day 12. Water was treated in a low flow CEDI system without an inline reservoir. The water was passed once through the depleting compartments (not through the cathode) under the following conditions:

- 25 cell pairs—low flow small stack with continuous duty, once through operation
- Compartment size: 7.5"×1.2" wide
- Resin filling: 60% IRA-458 Anion Resin, 40% SF-120 Cation Resin
- Concentrate re-circulation and product discharge flow rate: ~1 l/min
- Waste/reject continuous discharge flow rate: ~500 ml/min
- Electrode continuous flow rate: ~300 ml/min per electrode. Fresh feed water sent to electrode compartments
- Applied voltage=36 V, or 1.45V/cell
- Feed Conductivity=740 µS
- Product obtained from a once through operation Corrosion results from Trial 1 are reported in FIGS. 5 and 7 and provide a comparison of raw water, conventionally softened water and the water produced by the CEDI system, as described above.

Trial 2—

A—Stagnant water was used as a control (control) without any coupons. Samples of stagnant water not containing a coupon were analyzed on the $1^{st}$, $5^{th}$ and $12^{th}$ day, as were samples C, D and E (see below).

B—Each of the three waters (changing) was placed in a separate beaker and the water was changed periodically to allow the coupon immersed to come into contact with fresh water. This was done to observe the effect of fresh water on leaching. The exchanged water was analyzed each time the water was changed. The water in these samples was changed on the $1^{st}$, $5^{th}$, $9^{th}$ and the $12^{th}$ day.

C—A coupon was immersed in each of the three waters (stagnant) for exactly one day. The water was sent for analysis after one day.

D—A coupon was immersed in each of the three waters (stagnant) for 5 days. The water was sent for analyses after five days of stagnation.

E—A coupon was immersed in each of the three waters (stagnant) for 12 days. The water was sent for analyses after 12 days of stagnation.

Trial 2 was performed with a CEDI system using an inline reservoir and product-through-cathode technology under the following conditions:

- 25 cell pairs—product through cathode stack with inline reservoir/tank system
- Compartment size: 7.5"×1.2" wide
- Resin filling: 60% IRA-458 Anion Resin, 40% SF-120 Cation Resin
- Concentrate re-circulation and product re-circulation flow rate: ~1.4 l/min
- Waste/reject flush (flushed periodically) flow rate: ~200 ml/min
- Product water through cathode, concentrate re-circ. flow through anode
- Applied voltage=51V, or 2.04 V/cell
- Feed Conductivity=740 µS
- Sample of product water collected from tank at set point of about 220 microsiemens.

Figure 8:
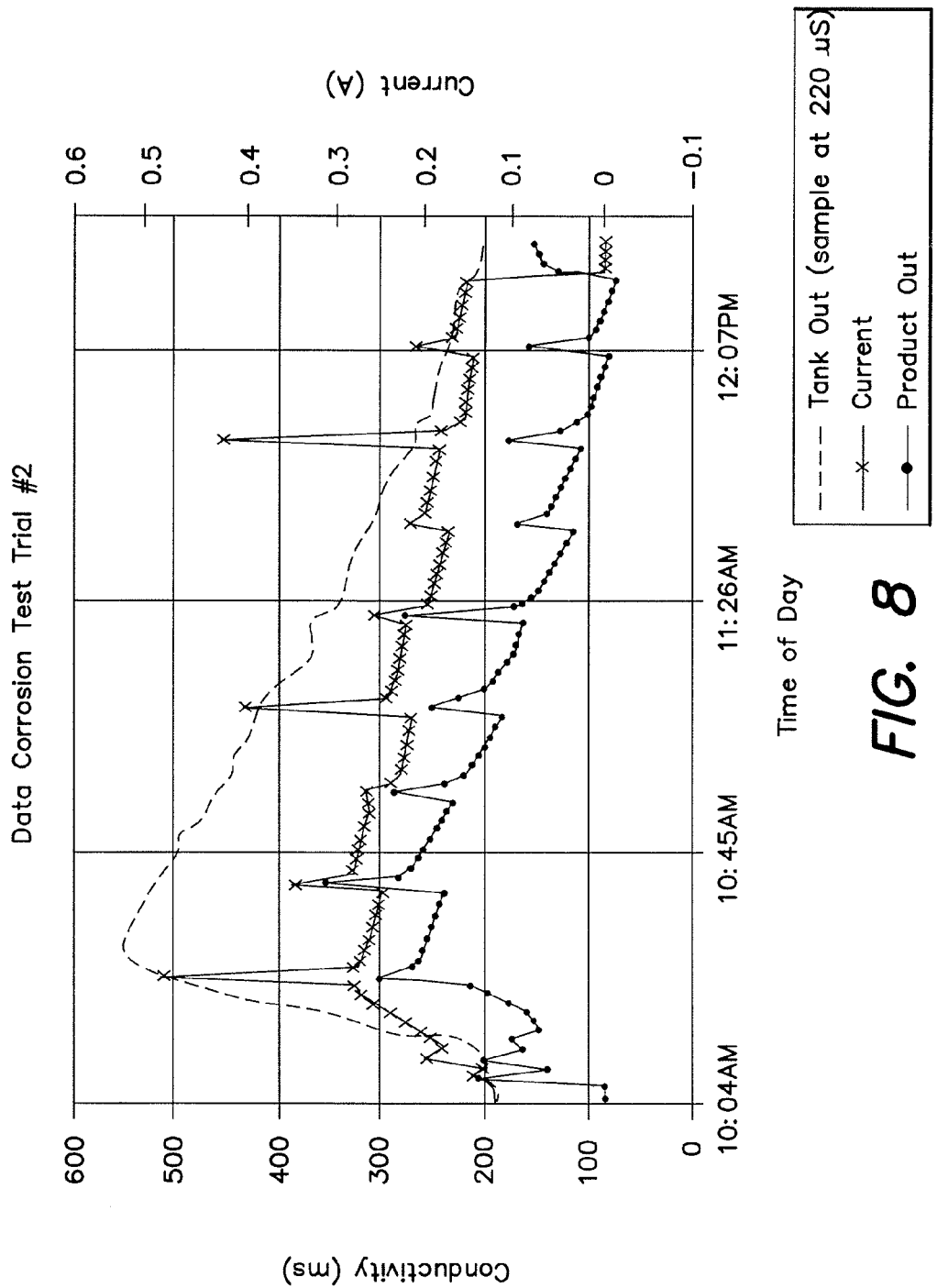
FIG. 8 graphically illustrates water conductivity out of a stack and out of a tank, as well as the current applied during operation in accordance with one or more embodiments of the invention.

Data from Trial 2 are presented below in FIG. 8. A comparison of the copper concentration, pH, LSI and alkalinity of the water treated by the CEDI system (PRODUCT), conventionally treated soft water (SOFT) and untreated hard water (HARD) is provided in Tables 1-4 below.

TABLE 1

| | Cu Concentration in ppm | | | | | | | | |
|---|---|---|---|---|---|---|---|---|---|
| | PRODUCT | | | SOFT | | | HARD | | |
| Day | Control | Stagnant | Changing | Control | Stagnant | Changing | Control | Stagnant | Changing |
| 0 | 0 | | | 0 | | | 0.004 | | |
| 1 | 0 | 0.17 | 0.142 | 0 | 0.289 | 0.318 | 0.005 | 0.309 | 0.273 |
| 5 | 0 | 0.538 | 0.493 | 0 | 0.685 | 0.752 | 0.006 | 0.764 | 0.741 |
| 9 | | | 0.418 | | | 0.703 | | | 0.922 |
| 12 | 0 | 0.529 | 0.489 | 0 | 0.843 | 0.725 | 0 | 0.867 | 1.101 |

TABLE 2

| | pH | | | | | | | | |
|---|---|---|---|---|---|---|---|---|---|
| | PRODUCT | | | SOFT | | | HARD | | |
| Day | Control | Stagnant | Changing | Control | Stagnant | Changing | Control | Stagnant | Changing |
| 0 | 7.3 | | | 8 | | | 7.9 | | |
| 1 | 7.8 | 7.7 | 7.7 | 8.2 | 8.3 | 8.1 | 8.2 | 8.2 | 8.2 |
| 5 | 8.2 | 8 | 7.9 | 8.7 | 8.7 | 8.5 | 8.2 | 8.5 | 8.5 |
| 9 | | | 8 | | | 8.6 | | | 8.4 |
| 12 | 8.2 | 8.2 | 8 | 8.8 | 8.8 | 8.6 | 8.4 | 8.7 | 8.5 |

TABLE 3

LSI @ 22 deg. C.

| | PRODUCT | | | SOFT | | | HARD | | |
|---|---|---|---|---|---|---|---|---|---|
| Day | Control | Stagnant | Changing | Control | Stagnant | Changing | Control | Stagnant | Changing |
| 0 | −1.3 | | | −1.7 | | | 0.6 | | |
| 1 | −0.7 | −0.8 | −0.8 | −1.4 | −1.3 | −1.5 | 1 | 0.9 | 0.9 |
| 5 | −0.4 | −0.6 | −0.7 | −0.9 | −1 | −0.8 | 0.8 | 1.2 | 1.2 |
| 9 | | | −0.7 | | | −1.6 | | | 1.1 |
| 12 | −0.4 | −0.4 | −0.6 | −0.9 | −0.9 | −0.5 | 0.4 | 1.4 | 1.2 |

TABLE 4

Alkalinity @ 22 deg. C.

| | PRODUCT | | | SOFT | | | HARD | | |
|---|---|---|---|---|---|---|---|---|---|
| Day | Control | Stagnant | Changing | Control | Stagnant | Changing | Control | Stagnant | Changing |
| 0 | 47 | | | 197 | | | 198 | | |
| 1 | 48 | 48 | 48 | 201.3 | 202 | 198 | 196.3 | 198 | 198 |
| 5 | 48 | 48 | 47 | 217 | 212 | 198 | 165 | 208 | 207 |
| 9 | | | 44 | | | 218 | | | 207 |
| 12 | 49 | 48 | 47 | 217 | 216 | 207 | 104 | 220 | 211 |

TDS levels: CDI treated water—about 135 ppm, Soft water—about 480 ppm, Hard water—about 490 ppm.

Figure 4:
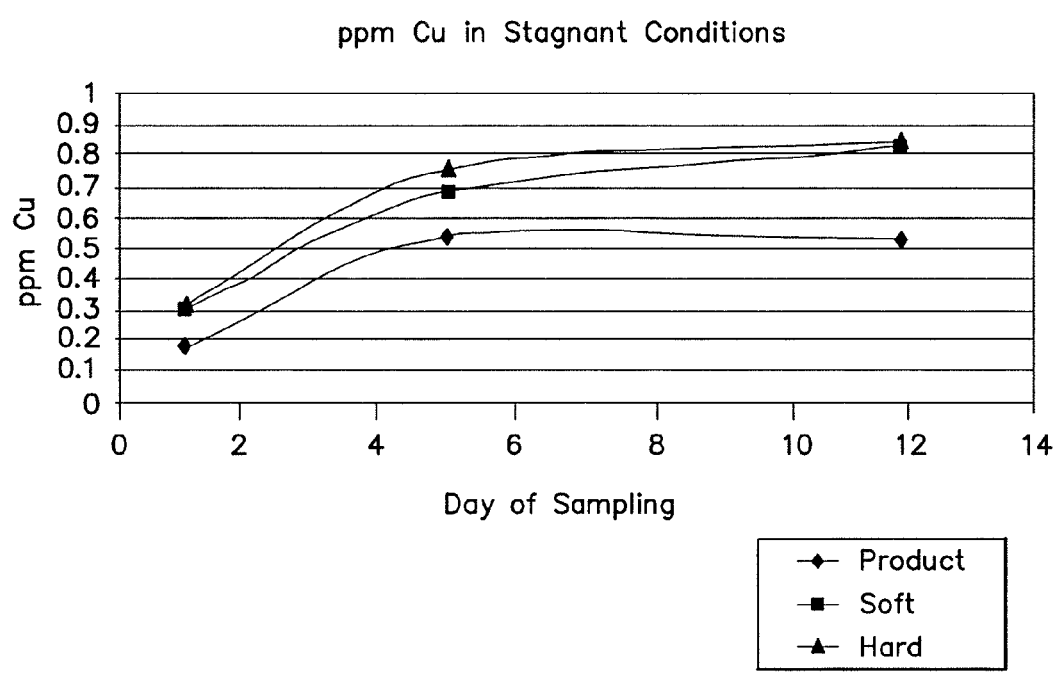
FIG. 4 is a graph showing copper extracted from a copper coupon by three different water samples.
Figure 5:
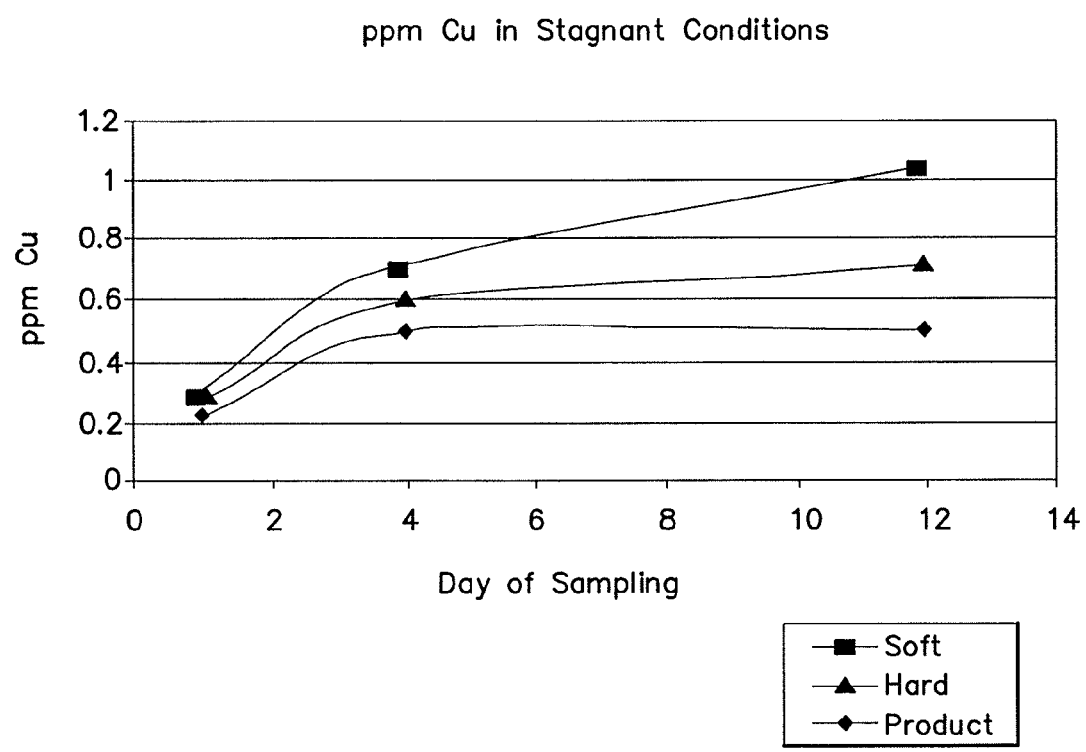
FIG. 5 is a graph showing copper extracted from a copper coupon after exposure to three different waters for various lengths of time.

FIG. 4 illustrates graphically the results under stagnant conditions from Trial 2. FIG. 5 illustrates graphically the results under stagnant conditions from Trial 1. Both FIGS. 4 and 5 show that the CEDI treated water is less corrosive than both the feed water and the conventionally softened water.

Figure 6:
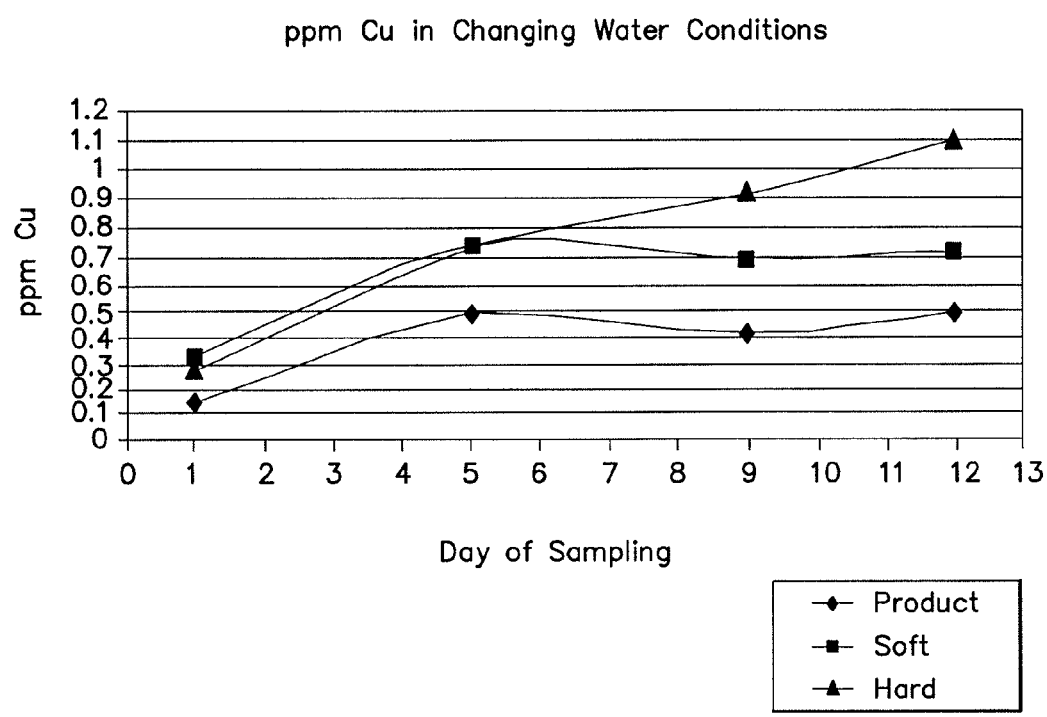
FIG. 6 is a graph showing the amount of copper extracted from copper coupons after exposure to three different waters where the water is being changed out at various intervals.
Figure 7:
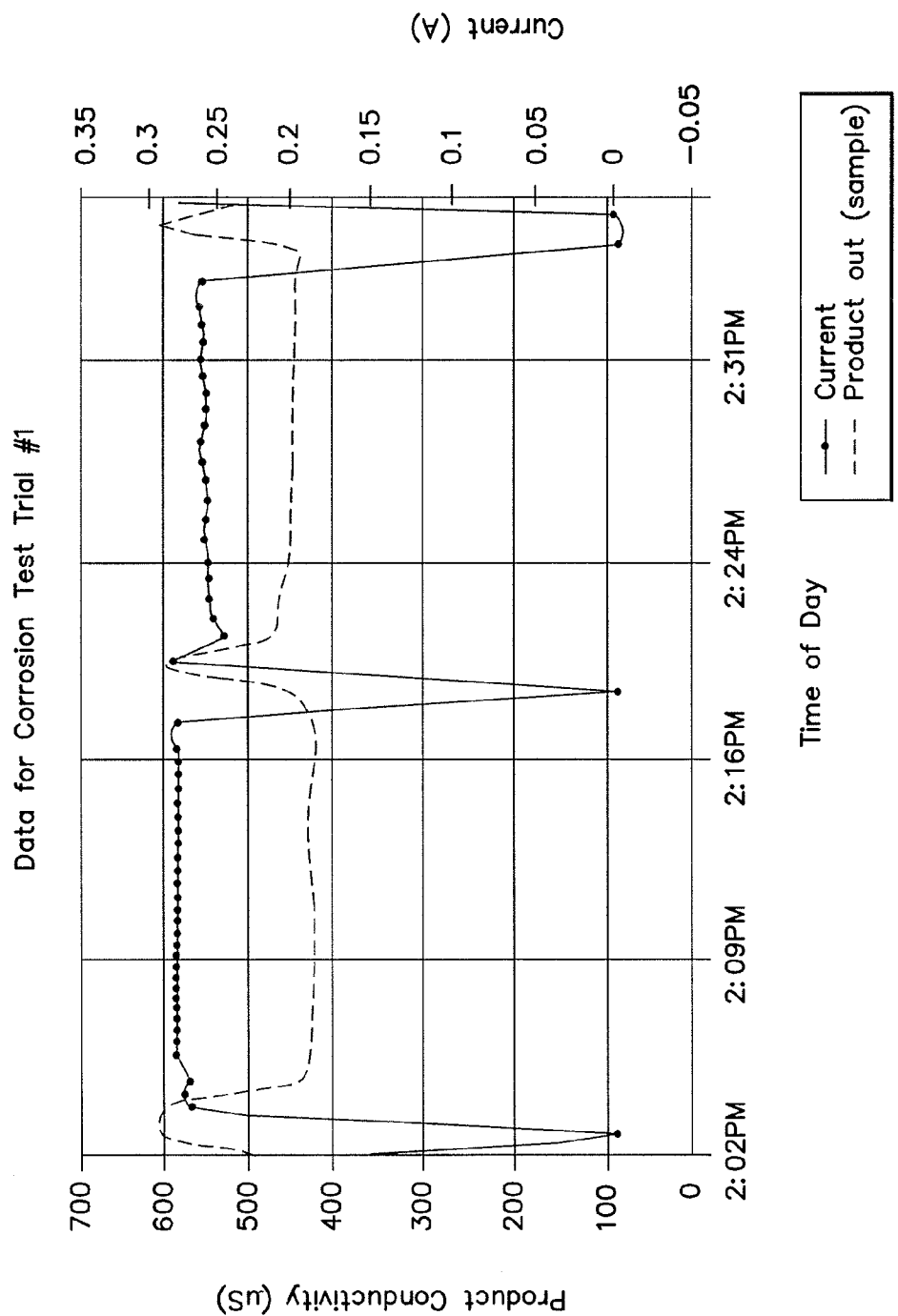
FIG. 7 graphically illustrates product water conductivity and current applied in accordance with one or more embodiments of the invention.

FIG. 6 illustrates graphically the results from Trial 2 when the water samples where intermittently changed. Again, the CEDI product water of the present invention was consistently less corrosive than both the feed water and the conventionally softened water. FIG. 7 illustrates the current used and the conductivity of the water produced in trial 1. FIG. 8 illustrates the current used and the conductivity of the water produced in trial 2 and shows improved water quality over that achieved in trial 1 (FIG. 7).

The results show that the concentration of copper leached in all trials and under all conditions was the lowest in the CEDI treated samples. The CEDI water had lower pH values than both the conventionally softened and the hard water. As expected, the pH, alkalinity and LSI values in the conventionally softened and the CEDI treated water samples increased with stagnation. The LSI and alkalinity values for untreated hard water decreased with stagnation. The concentration of copper leached increased with stagnation except in the CEDI treated water samples where the level of copper leached stabilized out after 5 days, as shown in FIG. 4.

Thus, the water treated using the apparatus of FIG. 3 (product through cathode) resulted in reduced copper leaching despite exhibiting a lower pH, a lower (negative) LSI and a lower alkalinity than either the hard feed water or the conventionally softened water. In addition, the CEDI water of trial 2 was significantly less conductive (purer) than that of trial 1, yet was as non-corrosive as was the higher conductivity water. This means the method and apparatus of trial 2 may be particularly suitable for use in a water supply system presenting copper pipes or other materials where corrosion may be a concern. As defined herein, a water is considered to be less corrosive if it exhibits a lower copper concentration when subjected to one or more of the testing procedures described above. The product water of the present invention therefore may be less corrosive than either the feed water or the conventionally softened water.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. For example, those skilled in the art may recognize that the system, and components thereof, according to the present invention may further comprise a network of systems or be a component of a system such as a household or residential management system. Further, the systems and techniques of the present invention has been described in terms of an electrodeionization device; however, other electrochemical devices or systems may be utilized as a treatment apparatus that reduces a concentration or removes, at least partially, any undesirable species in a fluid to be treated. Other suitable electrochemical devices can include electrodialysis apparatus and capacitive deionization apparatus. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems or methods, if such features, systems or methods are not mutually inconsistent, is included within the scope of the present invention.

What is claimed is:

1. A method of treating water comprising:
   providing water to be treated into a storage vessel;
   passing a first water stream from the storage vessel through a depleting compartment of an electrodeionization device;

applying an electric current through the electrodeionization device to produce a second water stream from the depleting compartment having a Langelier Saturation Index (LSI) of less than about 0;

passing the second water stream through a cathode compartment of the electrodeionization device to produce a treated water stream; and introducing at least a portion of the treated water stream into the storage vessel.

2. The method of claim 1 wherein the treated water stream is made less corrosive by reducing the concentration of oxidative species in the water stream.

3. The method of claim 1, further comprising supplying at least a portion of water from the storage vessel for a household consumption selected from the group consisting of bathing, laundering, and dishwashing.

4. The method of claim 1, further comprising circulating a concentrate through the concentrating and anode compartments of the electrodeionization device.

5. The method of claim 4, further comprising discharging to waste a portion of the concentrate circulating through the concentrating and anode compartments.

6. The method of claim 1, wherein all of the water from the depleting compartment is passed through the cathode compartment.

7. A method of providing potable water comprising:
providing water be treated;
introducing a first portion of the water to be treated into a storage vessel;
passing a first water stream comprising a second portion of the water to be treated through a cathode compartment of an electrodeionization device to produce a second water stream;
circulating a third water stream through a concentrating compartment and through an anode compartment of the electrodeionization device;
treating the second water stream in a depleting compartment of the electrodeionization device to produce treated potable water having a Langelier Saturation Index (LSI) of less than about 0; and
introducing the treated potable water into the storage vessel.

8. The method of claim 7 wherein the treated potable water is made less corrosive by reducing the concentration of oxidative species in the first water stream.

9. The method of claim 7, further comprising supplying at least a portion of water from the reservoir for household consumption.

10. The method of claim 9, further comprising post treating the at least a portion of water from the reservoir with at least one of actinic radiation, ultrafiltration, and microfiltration, prior to supplying the water for household consumption.

* * * * *